United States Patent

Vuitel et al.

[11] 4,016,157
[45] Apr. 5, 1977

[54] METAL COMPLEXES OF BIS-HYDRAZONES

[75] Inventors: Laurent Vuitel, Monthey; Francois L'Eplattenier, Therwil; André Pugin, Riehen, all of Switzerland

[73] Assignee: Ciba-Geigy Corporation, Ardsley, N.Y.

[22] Filed: Aug. 26, 1975

[21] Appl. No.: 607,968

[30] Foreign Application Priority Data

Sept. 5, 1974 Switzerland .................. 12101/74

[52] U.S. Cl. .................. 260/242; 260/270 K; 260/299; 8/4; 8/3
[51] Int. Cl.[2] ............ C07D 239/91; C07D 405/12; C07D 401/12
[58] Field of Search ...... 260/242, 270, 299, 270 K, 260/326.1

[56] References Cited

UNITED STATES PATENTS 3,290,299   12/1966   Kumins .............................. 260/242

Primary Examiner—Henry R. Jiles
Assistant Examiner—Robert T. Bond
Attorney, Agent, or Firm—Vincent J. Cavalieri

[57] ABSTRACT

Bis-hydrazone metal complexes of the formula

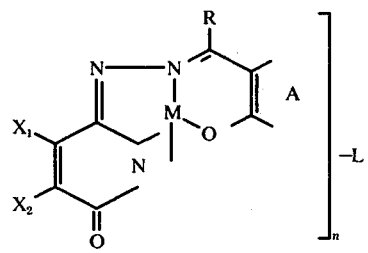

wherein A denotes an isocyclic or heterocyclic radical, R denotes a H atom, an alkyl group or an aryl radical, M denotes a divalent transition metal and zinc or cadmium, $X_1$ and $X_2$ independently of one another represent alkyl, cycloalkyl, aralkyl or aryl radicals, or conjointly form a fused carbocyclic or heterocyclic aromatic ring, L denotes a ligand having one or more coordinating N or S atoms, and n denotes the number 1 – 5, are useful for coloring plastic and lacquers in fast yellow to red shades.

16 Claims, No Drawings

METAL COMPLEXES OF BIS-HYDRAZONES

The present invention relates to new metal complexes of bis-hydrazones of the formula

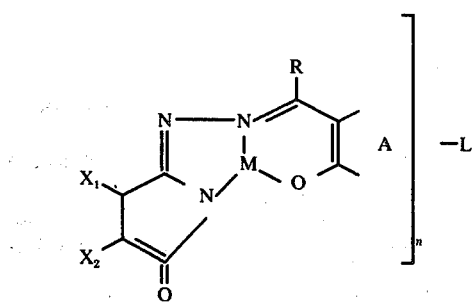

(I)

wherein A denotes an isocyclic or heterocyclic radical, R denotes a H atom, an alkyl group or an aryl radical, M denotes a divalent transition metal and zinc or cadmium, $X_1$ and $X_2$ independently of one another represent alkyl, cycloalkyl, aralkyl or aryl radicals, or conjointly form a fused carbocyclic or heterocyclic aromatic ring, L denotes a ligand having one or more coordinating N or S atoms, and n denotes the number $1 - 5$.

Preferred bis-hydrazone metal complexes are those of the formula

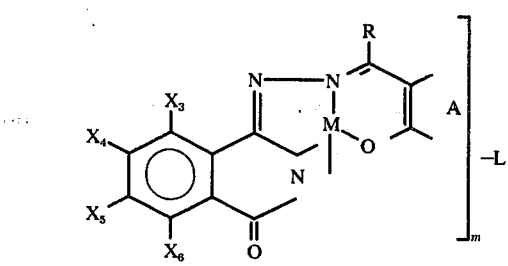

wherein A, L, R and M have the meaning indicated, $X_3$ denotes a H or halogen atom, an alkoxy or arylmercapto group containing $1 - 6$ C atoms, an aralkoxy group having an alkyl radical of $1 - 4$ C atoms, an aryloxy group, a nitro, carboxyl or carbamoyl group, alkylcarbamoyl or alkanoylamino group containing $2 - 6$ C atoms or an arylcarbamoyl group, $X_4$ denotes a H or halogen atom, $X_5$ denotes a H or halogen atom, an alkoxy or alkylmercapto group containing $1 - 6$ C atoms, an aralkoxy group having an alkyl radical of $1 - 4$ C atoms, or an aryloxy group and $X_6$ denotes a H or halogen atom, a nitro, carboxyl or carbamoyl group, an alkylcarbamoyl or alkanoylamino group containing $2 - 6$ C atoms, or an arylcarbamoyl group and m denotes the number $1 - 3$.

Compounds of particular interest are those of the formula

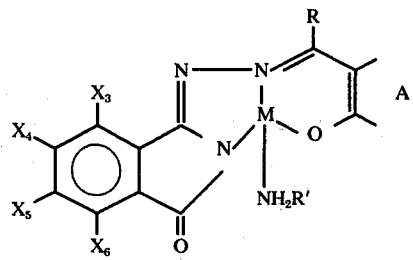

(III)

wherein A, R, $X_3$–$X_6$ and M have the meaning indicated and R' denotes a hydrogen atom, an OH group, an aliphatic or cycloaliphatic radical or an aromatic radical which is preferably free from strongly electron-attracting groups, or an amino, alkylamino, arylamino, acyl or acylamino group or a group of the formula

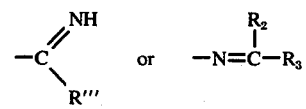

wherein $R_2$ and $R_3$ denote H atoms or alkyl or aryl groups and R''' denotes a H atom or an amino, alkyl or phenyl group.

Preferred metal complexes are also those of the formula

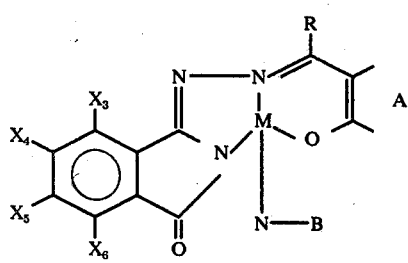

(IV)

wherein A, R, M, $X_3 - X_6$ have the meaning indicated and B, conjointly with the N atom, forms a heterocyclic ring system, preferably a pyridine ring.

Preferred metal complexes are also those of the formula

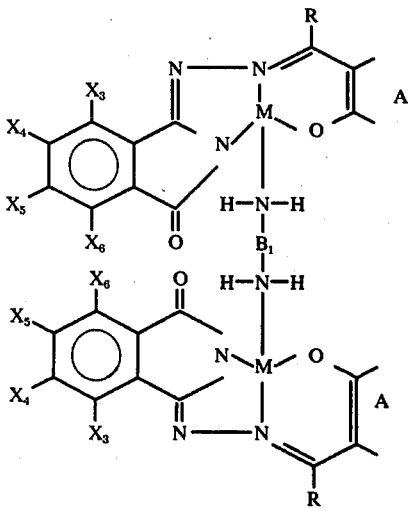

(V)

wherein A, R, M, $X_3 - X_6$ have the meaning indicated and $B_1$ is an alkylene group containing 2 – 10 C atoms, or an arylene group.

In the metal complexes of the formula indicated, M denotes, for example, a $Co^{2+}$ or $Zn^{2+}$ atom but preferably denotes a $Cu^{2+}$ atom and in particular a $Ni^{2+}$ atom.

In the formulae indicated $X_4$ and $X_6$ perferably represent H or chlorine atoms, and $X_3$ and $X_5$ preferably represent H or chlorine atoms or alkoxy groups containing 1 – 4 C atoms.

R preferably denotes a H atom, an alkyl group containing 1 – 4 C atoms, or a phenyl group.

In the formulae indicated, A preferably denotes a radical of the formula

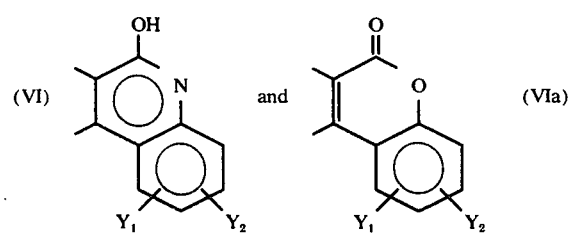

wherein $Y_1$ and $Y_2$ denote H or halogen atoms, alkyl or alkoxy groups having 1 – 4 C atoms, or nitro groups.

Preferred metal complexes are also those of the formula indicated wherein A denotes a radical of the formula

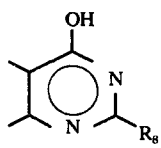 (VII)

wherein $R_8$ denotes an OH group, an alkyl group containing 1 – 4 C atoms, or a phenyl radical which is optionally substituted by halogen atoms or alkyl or alkoxy groups containing 1 – 4 C atoms.

The new metal complexes are obtained if a bishydrazone of the formula

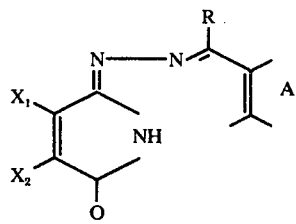 (VIII)

is treated, in the presence of a ligand L which has the abovementioned meaning, with agents which donate the divalent transition metals or zinc and cadmium.

The starting material is preferably a bis-hydrazone of the formula

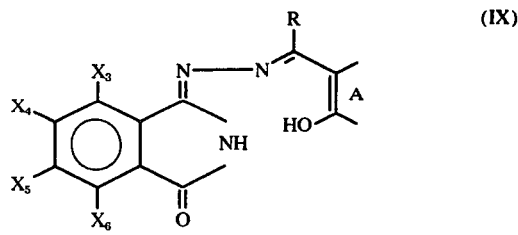 (IX)

wherein A, R and $X_3 - X_6$ have the abovementioned meaning.

In formula (VIII) A preferably represents a radical of the formula (VI) or (VII).

The bis-hydrazones of the formula (VIII) are obtained a) by condensing a mono-hydrazone of the formula

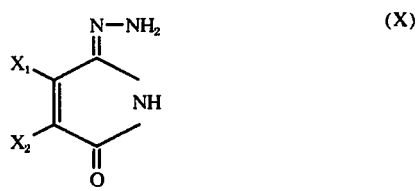 (X)

with a hydroxyaldehyde or hydroxyketone of the formula

 (XI)

or b) by condensing a compound of the formula

 (XII)

wherein V denotes a group of the formula

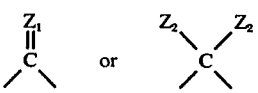

wherein $Z_1$ denotes an imino or thio group and the $Z_2$ denote halogen atoms, alkoxy groups, particularly methoxy groups, of sec. amino groups, with a monohydrazone of the formula

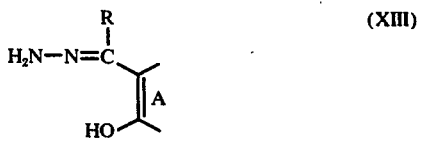 (XIII)

or c) by condensing a mono-hydrazone of the formula (X) with an azomethine of the formula

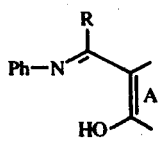

(XIV)

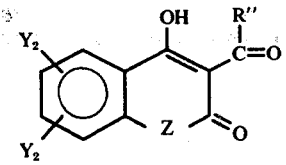

(XV)

wherein Ph denotes a phenyl radical which is optionally substituted by halogen atoms, alkyl or alkoxy groups, containing 1 – 4 C atoms, alkoxycarbonyl groups containing 2 – 6 C atoms or nitro or trifluoromethyl groups, and, in the formulae (VIII), (IX) and (XI), A and R have the meaning indicated and, in the formulae (VIII), (X) and (XII), $X_1$ and $X_2$ have the meaning indicated.

The hydrazones of the formula (X) are obtained by reacting hydrazine with a compound of the formula (XII). The following should be mentioned as examples of compounds of the formula (XII): 3-imino-4,5-dichloro-pyrrolinone, 3-imino-4,5-dimethyl-pyrrolinone, 3-imino-4,5-dimethyl-pyrrolinone, 3-imino-4,5-dicyclohexyl-pyrrolinone, 3-imino-4,5-diphenyl-pyrrolinone, 3-imino-isoindolinone, 4,5,6,7-tetrachloro-3-imino-isoindolinone, 5,6-dichloro-3-imino-isoindolinone, 4,5,7-trichloro-6-methoxy-3-imino-isoinodlinone, 4,5,7-trichloro-6-ethoxy-3-imino-isoindolinone, 5,7-dichloro-4,6-dimethoxy-3-imino-isoinodolinone, 5,7-dichloro-4,6-diphenoxy-3-imino-isoindolinone, 4,5,7-trichloro-6-methylmercapto-3-imino-isoindolinone, 4,5,7-trichloro-6-phenylmercapto-3-imino-isoindolinone, 3-imino-4,5-benzo-isoindolinone, 4,5,6,7-tetraphenoxy-3-imino-isoindolinone, 5- or 6-methyl-3-imino-isoindolinone, 5- or 6-phenyl-3-imino-isoindolinone, 4- or 7-chloro-3-imino-isoindolinone, 5- or 6-chloro-3-imino-isoindolinone, 4- or 7-nitro-3-imino-isoindolinone, 5- or 6-nitro-3-imino-isoindolinone, 5- or 6-methoxy-3-imino-isoindolinone, 5- or 6-ethoxy-3-imino-isoindolinone, 5- or 6-phenoxy-3-imino-isoindolinone, 5-or 6-methylmercapto-3-imino-isoindolinone, 5- or 6-methylsulphonyl-3-imino-isoindolinone, 5- or 6-acetylamino-3-imino-isoindolinone, 3-imino-4,7-dithia-4,5,6,7-tetrahydro-isoindolinone, 3-imino-4,7-diaza-isoindolinone, 3,3-dimethoxy-4,5,6,7-tetrachloro-isoindolinone, 3,3-dimethoxy-4,5,6,7-tetrabromo-isoindolinone, 3,3,6-trimethoxy-4,5,7-trichloro-isoindolinone, 3,3-dimethoxy-4,5,7-trichloro-6-butoxy-isoindolinone, 3,3-dimethoxy-4,5,7-trichloro-6-phenoxy-isoindolinone, 3,3-dimethoxy-4,5,7-trichloro-6-(p-chlorophenoxy)-iso-indolinone, 3,3-dimethoxy-4,5,7-trichloro-6-(o-methylphenoxy)-iso-indolinone, 3,3-dimethoxy-4,5,7-trichloro-6-methylmercapto-isoindolinone, 3,3,-dmethoxy-4,5,7-trichloro-6-ethylmercapto-isoindolinone and 3,3,4,6-tetramethoxy-5,7-dichloro-isoindolinone.

The pyrrolinones and isoindolinones mentioned are known compounds.

In accordance with process a), the hydrazones of the formula (X) are condensed with hydroxyaldehydes or hydroxyketones of the formula (XI).

Aldehydes and ketones of particular interest are those of the formula wherein $Y_1$ and $Y_2$ have the meaning indicated, R'' denotes a H atom or a methyl group and Z denotes a NH group or an O atom, and, in particular, the hydroxyquinolines of the formula

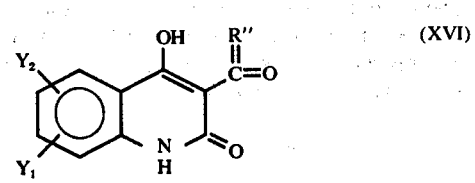

(XVI)

wherein R'', $Y_1$ and $Y_2$ have the meaning indicated.

Aldehydes and ketones of particular interest are also those of the following formulae

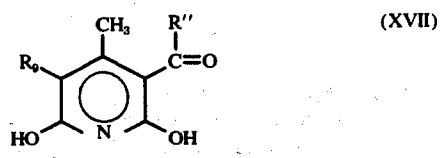

(XVII)

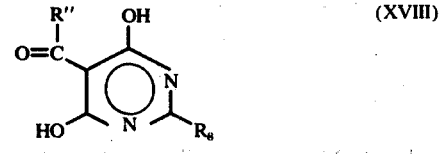

(XVIII)

wherein $R_9$ denotes a cyano, carboxyl or carbamoyl group and R''and $R_8$ have the meaning indicated above, or aldehydes and ketones of the formula

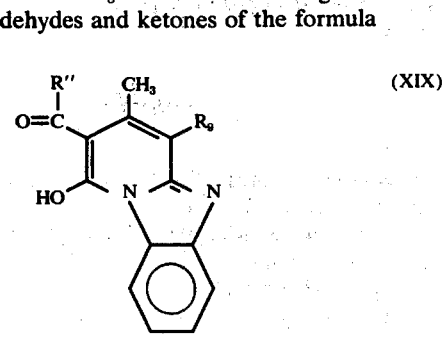

(XIX)

wherein R'' and $R_9$ have the meaning indicated above, and also aldehydes or ketones of the formula

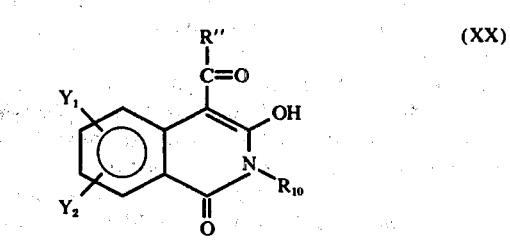

(XX)

wherein R₁₀ denotes a H atom or an alkyl or aryl group, and wherein R'', Y₁ and Y₂ have the meaning indicated above, or aldehydes and ketones of the formula

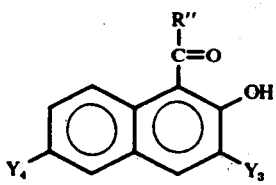 (XXI)

wherein Y₃ denotes a H atom or a carboxyl, carbamoyl, phenylcarbamoyl or alkoxycarbonyl group containing 2 – 6 C atoms, and Y₄ denotes a H or halogen atom or a methoxy, nitro or cyano group, or pyrazolone-aldehydes or pyrazolone-ketones of the formula

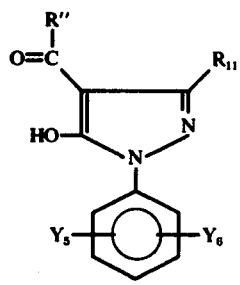 (XXII)

wherein R₁₁ denotes an alkyl group containing 1 – 4 C atoms, an alkoxycarbonyl group containing 2 – 5 C atoms, a carboxyl group, a carbamoyl group or a group of the formula

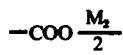

wherein M₂ denotes a Ca, Sr, Ba or Mn atoms, and Y₅ and Y₆ denote H or halogen atoms, alkyl or alkoxy groups containing 1 – 4 C atoms, nitro, acylamino, carbamoyl or sulphamoyl groups or groups of the formula

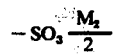

wherein M₂ denotes a Ca, Sr, Ba or Mn atoms and R'' has the meaning indicated above.

The following aldehydes or ketones should be mentioned as examples:

1. hydroxybenzaldehydes:

Salicylaldehyde, 4-chloro-2-hydroxybenzaldehyde, 5-chloro-2-hydroxybenzaldehyde, 3-nitro-2-hydroybenzaldehyde, 5-nitro-2-hydroxybenzaldehyde, 3,5-dichloro-2-hydroxybenzaldehyde, 3,5-dibromo-2-hydroxybenzaldehyde, 5-phenylazo-2-hydroxybenzaldehyde, 5-(2'-chloro-phenylazo)-hydroxybenzaldehyde, 5-(2',5'-dichloro-phenylazo)-2-hydroxybenzaldehyde, 5-(2'-methyl-phenylazo)-2-hydroxybenzaldehyde, 5-(2'-methoxyphenylazo)-2-hydroybenzaldehyde, 5-(2'-methoxy-4'-nitrophenylazo)-2-hydroxybenzaldehyde and 5-(2'-methoxy-5'-carbamoyl-phenylazo)-2-hydroxybenzaldehyde.

2. Hydroxynaphthaldehydes: 2-Hydroxynaphthaldehyde, 6-bromo-2-hydroxynapthaldehyde, 5-nitro-2-hydroxynaphthaldehyde, 2-hydroxy-3-carboxynaphthaldehyde, 2-hydroxy-3-methoxycarbonyl-naphthaldehyde, 2-hydroxy-3-phenylcarbamoyl-naphthaldehyde, 2-hydroxy-3-(4'-chlorophenylcarbamoyl)-naphthaldehyde, 2-hydroxy-3-(4'-chloro-2'-methylphenylcarbamoyl)-naphthaldehyde, 2-hydroxy-3-(2',5'-dimethoxy-3'-chloro-phenylcarbamoyl-naphthaldehyde, 2-hydroxy-6-bromo-3-carboxynaphthaldehyde and 2-hydroxy-6-bromo-3-phenylcarbamoylnaphthaldehyde.

3. Heterocyclic aldehydes and ketones:

2,6-Dihydroxy-4-methyl-5-cyano-3-pyridinealdehyde, 2,6-dihydroxy-4-methyl-5-carboxy-3-pyridinealdehyde, 2,6-dihydroxy-4-methyl-5-carbamoyl-3-pyridinealdehyde, 2,4-dihydroxy-3-quinolinealdehyde, 5-chloro-2,4-dihydroxy-3-quinolinealdehyde, 6-chloro-2,4-dihydroxy-3-quinolinealdhyde, 7-chloro-2,4-dihydroxy-3-quinolinealdehyde, 8-chloro-2,4-dihydroxy-3-quinolinealdehyde, 6,8-dichloro-2,4-dihydroxy-3-quinolinealdehyde, 7,8-dichloro-2,4-dihydroxy-3-quinolinealdehyde, 6-methyl-2,4-dihydroxy-3-quinolinealdehyde, 7-methyl-2,4-dihydroxy-3-quinolinealdehyde, 8-methyl-2,4-dihydroxy-3-quinolinealdehyde, 6-chloro-8-methyl-2,4-dihydroxy-3-quinolinealdehyde, 2,4-dihydroxy-3-acetyl-quinoline, 2,4-dihydroxy-3-acetyl-6-methyl-quinoline, 2,4-dihydroxy-3-acetyl-6-chloro-quinoline, 2,4-dihydroxy-3-benzoyl-quinoline, 2-methyl-4,6-dihydroxy-5-pyrimidinealdehyde, 2-phenyl-4,6-dihydroxy-5-pyrimidinealdehyde, 2,4,6-trihydroxy-5-pyrimidinealdehyde, 2,4,6-trihydroxy-5-acetylpyrimidine, 4-hydroxy-3-quinaldinealdehyde, 6-chloro-4-hydroxy-3-quinaldinealdehyde, 6-methoxy-4-hydroxy-3-quinaldinealdehyde, 3-hydroxy-isoquinolone-4-aldehydes and other aldehydes. 4-hydroxycoumarin-3-aldehyde, 1-phenyl-3-methyl-4-formyl-5-pyrazolone, 1-phenyl-3-carboxy-4-formyl-5-pyrazolone, 1-phenyl-3-methoxycarbonyl-4-formyl-5-pyrazolone, 1-phenyl-3-ethoxycarbonyl-4-formyl-5-pyrazolone, 1-(2'-chlorophenyl)-3-methyl-4-formyl-5-pyrazolone, 1-(4'-chlorophenyl)-3-methyl-4-formyl-5-pyrazolone, 1-(2'-methylphenyl)-3-methyl-4-formyl-5-pyrazolone, 1-(4'-methylphenyl)-3-methyl-4-formyl-5-pyrazolone and 1-phenyl-3-carbamoyl-4-formyl-5-pyrazolone.

Instead of the aldehydes or ketones, it is also possible to use imines thereof, particularly the phenylimines of the formula XIV (process c), which can be obtained by known methods.

The mono-hydrazones of the formula (XIII) required for process b) are obtained, for example, by reacting the corresponding hydroxyketones or hydroxyaldehydes with hydrazine. The condensation of the hydrazone with the oxo compound or the isoindolinone is appropriately carried out in water or an organic solvent at elevated temperature, preferably between 50° C and the boiling point of the solvent used. The following examples of solvents should be mentioned: water, alcohol, glacial acetic acid, dioxane, dimethylformamide, N-methylpyrrolidone, butyrolactone, glycol monoethyl ether, ethylene glycol, carbitol, glycol monomethyl ether, xylene, chlorobenzene, o-dichlorobenzene, nitrobenzene or mixtures thereof.

Since the resulting azomethines are sparingly soluble in the solvents mentioned, they can be isolated easily by filtration. Impurities which may be present can be removed by washing.

In certain cases it is possible to dispense with the isolation of the bis-azomethine and to carry out the reaction of the components (X) and (XI) or (XII) and (XIII) respectively in the same vessel, in the presence of the metal donor and the ligand L.

The process c) proves particulary advantageous for the manufacture of metal complexes of the formula (III) wherein R' deontes a phenyl radical.

As metal donors, the salts of zinc, manganese, cobalt, iron, preferably copper, and, in particular, nickel, should be mentioned. It is preferable to use the formates or acetates of these metals.

Ligands L which can be used are those having one or more coordinating N or S atoms.

N-containing ligands which can be used are preferably ammonia or primary aliphatic, cycloaliphatic or aromatic amines or amines, as well as secondary and tertiary heterocyclic amines, the N atoms of which are constituents of one or more rings.

Ligands of particular interest are those of the formula R'—NH$_2$ or

wherein R' and B have the abovementioned meaning.

It is possible to use the most diverse monoamines or polyamines, for example alkylamines having 1 – 10 C atoms, dialkylamines having 2 – 12 C atoms, phenylalkylamines, the alkyl radical of which contains 1 – 4 C atoms, mono- or di-cycloalkylamines having 5 – 6 C atoms in the cycloalkyl radical, heterocyclic, aromatic and cycloaliphatic amines or monoaminobenzenes.

Diamines which can be used are preferably those of the formula H$_2$N—B$_2$—NH$_2$ wherein B$_2$ denotes an alkylene group containing 2 – 10 C atoms, a p-phenylene group or a group —Ph—X—Ph wherein X denotes a direct bond, an O or S atom, a methylene or ethylene group or a group of the formula —NH—, —SO$_2$— or —CO— or —N=N—, or heterocyclic diamines.

Other N-containing ligands which should be mentioned are hydroazine, alkylhydrazines having 1–6 C atoms, arylhydrazines and hydrazones, hydroxylamine, amidines and hydrazides, and preferred S-containing ligands which should be mentioned are the mercaptans.

The following ligands should be mentioned as examples: Ammonia, methylamine, ethylamine, ethanolamine, methoxyethylamine, N-propylamine, isopropylamine, n-butylamine, n-hexylamine, cyclohexylamine, n-octylamine, n-decylamine, n-propylamine, di-(2'-aminoethyl))-amine, tri-(2'-aminoethyl)-amine, ethylenediamine, 1,3-propylenediamine, 1,4-butylenediamine, 1,6-hexylenediamine, benzylamine, aniline, 4-amino-4'-dimethylaminoazobenzene, 2-, 3- or 4-methylaniline, dimethylanilines, chloroaniline, 2,4, 3,4 or 2,5-dichloroaniline, 3-trifluoromethylaniline, 2-, 3- or 4-methoxyaniline, 2-, 3- or 4-ethoxyaniline, 4,4'-diamino-diphenyl oxide, 4,4'-diaminodiphenyl sulphide, 4,4'-diamino-diphenylmethane, 4,4'-diamino-diphenyl-sulphone, 4,4'-diamino-diphenylketone, 4,4'-diamino-azobenzene, 4'-amino-4'-dimethylamino-azobenzene, 2,2'-dimethyl-4,4'-diaminoazobenzene, 2,2'-dimethoxy-4,4'-diaminoazobenzene, tri-(4-aminophenyl)-amine, 1,2,3,-tri-(4'-aminophenoxy)-propane, tetra-(4'-aminophenoxymethyl)-methane, 1-(2'-amino-ethylamino)-anthraquinone, 1-(4'-aminophenylamino-anthraquinone, pyridine, picolines, lutidines, quinoline, isoquinoline, pyrrolidone, piperidine, piperazine, N-methyl-piperazine, morpholine, 2-amino-benzimidazole, 2-amino-benzthiazole, diethylenediamine, triethylenediamine, guanidine, 3-aminobenzoic acid amide, 3-amino-benzoic acid anilide, 3- or 4-acetylamino-aniliner, 3- or 4-benzoylamino-aniline, hydrazine, methylhydrazine, phenylhydrazine, 1,3,5-trihydrazino-s-triazine, 4-methylphenyl-hydrazine, acetaldehydehydrazone, benzaldehydehydrazone, acetonehydrazone, acetophenonehydrazone, cyclohexanonehydrazone, hydroxylamine, formamidine, formamide, dimethylformamide, acetamide, benzamide, acetohydrazide, benzhydrazide, semicarbazide and decanetriol.

The polyfunctional ligands can be reacted according to choice with one or more mols of the bis-hydrazone metal complex. Among the polyfunctional ligands, the diamines are preferred. The molar ratio between metal complex and diamine is appropriately chosen in such a way that each amino group is linked to one metal atom.

The addition of the ligand can take place before or at the same time as the addition of the metal ion.

The reaction of bis-hydrazones with the ligands and the metal donors is appropriately carried out at between 50° and 150° in an organic solvent, appropriately in one of the abovementioned solvents.

The new bis-hydrazone metal complexes are valuable pigments which can be used in a finely divided form for pigmenting high-molecular organic material, for example cellulose ethers and esters, such as ethylcellulose, nitrocellulose, cellulose acetate or cellulose butyrate, natural resins or synthetic resins, such as polymerisation resins or condensation resins, for example aminoplasts, particularly urea-formaldehyde and melamine-formaldehyde, alkyd resins, phenoplasts, polycarbonates, polyolefines, such as polystyrene, polyvinyl chloride, polyethylene, polypropylene, polyacrylonitrile, polyacrylic acid esters, polyamides, polyurethanes or polyesters, rubber, casein, silicone and silicone resins, on their own or as mixtures.

It is immaterial here whether the high molecular compounds mentioned are present as plastic compositions or melts or in the form of spinning solutions, lacquers, paints or printing inks. Depending on the application, it proves advantageous to use the new pigments as toners or in the form of preparations.

The new pigments are distinguished by a surprisingly good heat stability, high tinctorial strength and pure shade and, very often, by a surprisingly increased insolubility.

In the examples which follow, unless otherwise specified, the parts denotes parts by weight and the percentages denote percentages by weight.

EXAMPLE 1

1.32 parts of 2,4-dihydroxyquinoline-3-N-phenylaldimine and 1.50 parts of 4,5,6,7-tetrachloro-isoindolin-1-on-3-ylidenehydrazine are stirred for 10 minutes at 100° C in 75 parts by volume of methylcellosolve; the mixture is reacted with 1.25 parts of nickel acetate tetrahydrate and is warmed for a further 4 hours at 100° C. The reaction product is filtered off while hot, rinsed with alcohol and acetone and dried at 80° C in vacuo. This gives 2.67 parts (86% of theory) of a yellow pigment of the formula:

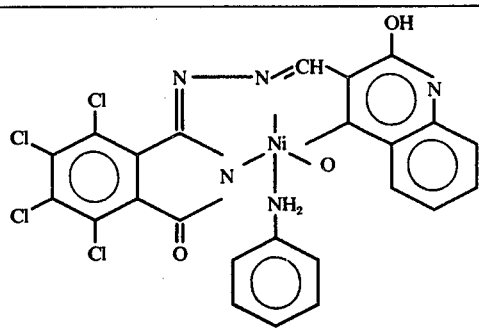

| Micro-analysis: % | C | H | N | Cl | Ni |
|---|---|---|---|---|---|
| calculated | 46.49 | 2.11 | 11.29 | 22.87 | 9.46 |
| found | 45.8 | 2.2 | 11.5 | 22.8 | 9.2 |

EXAMPLE 2

2.35 parts of the bis-hydrazones (formed, for examples, from 2,4-dihydroxyquinoline-3-aldehyde and 4,5,6,7-tetrachloroisoindolin-1-on-3-ylidenehydrazine), 0.47 part by volume of aniline and 1.25 parts of nickel acetate tetrahydrate are stirred for 3 hours at 100° C in 75 parts by volume of methylcellosolve. The thick mass is filtered at 85°–90° C and the product is washed with alcohol and acetone and dried, 2.75 parts (89% of theory) of the pigment of the formula according to Example 1 being obtained.

| Micro-analysis: % | C | H | N | Cl | Ni |
|---|---|---|---|---|---|
| calculated | 46.49 | 2.11 | 11.29 | 22.87 | 9.46 |
| found | 46.5 | 2.1 | 11.4 | 22.7 | 9.5 |

The complexes of Examples 3 - 9 were prepared in accordance with Example 1 and those of Examples 10 - 13 were prepared in accordance with Example 2:

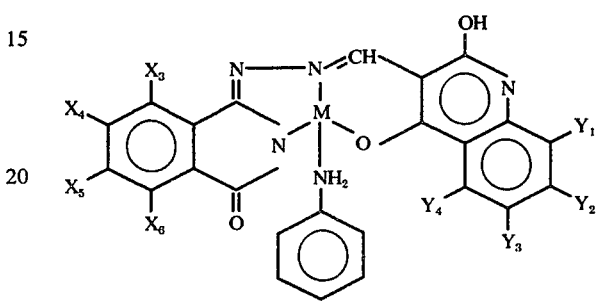

wherein the symbols have the meaning indicated in Table 1.

TABLE 1

| Example | $Y_1$ | $Y_2$ | $Y_3$ | $Y_4$ | $X_6$ | $X_5$ | $X_4$ | $X_3$ | M | Yield | Shade in PVC |
|---|---|---|---|---|---|---|---|---|---|---|---|
| 3 | H | H | H | H | Cl | OCH$_3$ | Cl | Cl | Ni | 91% | yellow |
| 4 | H | H | H | H | Cl | OCH$_3$ | Cl | OCH$_3$ | Ni | 87% | yellow |
| 5 | H | H | H | H | Cl | OCH$_3$ | Cl | OCH$_3$ | Cu | 78% | greenish-tinged yellow |
| 6 | H | H | Cl | H | Cl | Cl | Cl | Cl | Ni | 88% | yellow |
| 7 | H | H | Cl | H | Cl | OCH$_3$ | Cl | Cl | Ni | 90% | yellow |
| 8 | H | H | Cl | H | Cl | OCH$_3$ | Cl | OCH$_3$ | Ni | 87% | yellow |
| 9 | Cl | Cl | H | H | Cl | OCH$_3$ | Cl | OCH$_3$ | Ni | 90% | yellow |
| 10 | H | H | H | H | Cl | OCH$_3$ | Cl | Cl | Ni | 88% | yellow |
| 11 | H | H | H | H | Cl | OCH$_3$ | Cl | OCH$_3$ | Ni | 93% | yellow |
| 12 | H | H | H | H | Cl | OCH$_3$ | Cl | OCH$_3$ | Cu | 85% | greenish-tinged yellow |
| 13 | H | H | H | H | H | H | H | H | Ni | 85% | yellow |

The metal complexes of formula A, which contain the ligand L instead of aniline and which were prepared in accordance with Example 2, are shown in Examples 14–92 in Table 2.

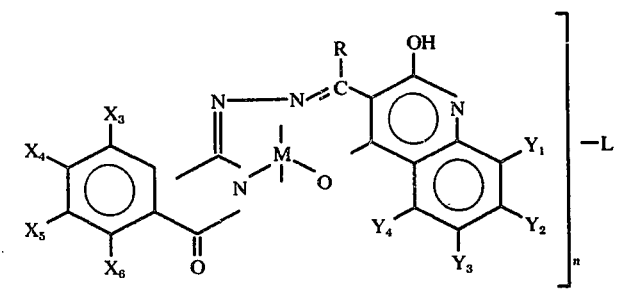

(A)

TABLE 2

| Example | $Y_1$ | $Y_2$ | $Y_3$ | $Y_4$ | $X_3$ | $X_4$ | $X_5$ | $X_6$ | R | M | n | L | Yield | Shade in PVC |
|---|---|---|---|---|---|---|---|---|---|---|---|---|---|---|
| 14 | H | H | H | H | $OCH_3$ | Cl | $OCH_3$ | Cl | H | Ni | 1 | 4-Chloroaniline | 90% | yellow |
| 15 | H | H | H | H | $OCH_3$ | Cl | $OCH_3$ | Cl | H | Ni | 1 | 4-Methylaniline | 89% | yellow |
| 16 | H | H | H | H | $OCH_3$ | Cl | $OCH_3$ | Cl | H | Ni | 1 | 4-Methoxyaniline | 90% | yellow |
| 17 | H | H | H | H | $OCH_3$ | Cl | $OCH_3$ | Cl | H | Ni | 1 | 5-Aminobenzimidazole | 94% | yellow |
| 18 | H | H | H | H | $OCH_3$ | Cl | $OCH_3$ | Cl | H | Ni | 1 | Benzylamine | 89% | yellow |
| 19 | H | H | H | H | $OCH_3$ | Cl | $OCH_3$ | Cl | H | Ni | 1 | Cyclohexylamine | 87% | yellow |
| 20 | H | H | H | H | $OCH_3$ | Cl | $OCH_3$ | Cl | H | Ni | 1 | 2,2,6,6-Tetramethyl-4 aminopiperidine | 71% | yellow |
| 21 | H | H | H | H | $OCH_3$ | Cl | $OCH_3$ | Cl | H | Ni | 1 | Pyridine | 86% | yellow |
| 22 | H | H | H | H | $OCH_3$ | Cl | $OCH_3$ | Cl | H | Ni | 1 | n-Octylamine | 87% | yellow |
| 23 | H | H | H | H | $OCH_3$ | Cl | $OCH_3$ | Cl | H | Ni | 1 | 2-Ethanolamine | 86% | yellow |
| 24 | H | H | H | H | $OCH_3$ | Cl | $OCH_3$ | Cl | H | Ni | 1 | $NH_3$ | 74% | yellow |
| 25 | H | H | H | H | Cl | Cl | Cl | Cl | H | Ni | 1 | $NH_3$ | 92% | yellow |
| 26 | H | H | H | H | Cl | Cl | Cl | Cl | H | Ni | 2 | 4,4'-Diaminodiphenyl-sulphone | 92% | yellow |
| 27 | H | H | H | H | $OCH_3$ | Cl | $OCH_3$ | Cl | H | Ni | 2 | 4,4'-Diaminodiphenyl-sulphone | 86% | yellow |
| 28 | H | H | H | H | $OCH_3$ | Cl | $OCH_3$ | Cl | H | Ni | 2 | Hexamethylenediamine | 96% | yellow |
| 29 | H | H | H | H | Cl | Cl | $CH_3O$ | H | H | Ni | 1 | $NH_3$ | 34.4% | yellow |
| 30 | H | H | H | H | $CH_3O$ | Cl | $CH_3O$ | Cl | H | Zn | 1 | $NH_3$ | 59.3% | yellow |
| 31 | H | H | H | H | Cl | Cl | PhO | Cl | H | Ni | 1 | $NH_3$ | 83.3% | yellow |
| 32 | H | H | H | H | H | H | H | H | H | Ni | 1 | $NH_3$ | 90.0% | yellow |
| 33 | H | H | $CH_3$ | H | Cl | Cl | $CH_3O$ | Cl | H | Ni | 1 | $NH_3$ | 92.1% | yellow |
| 34 | H | H | $CH_3$ | H | Cl | Cl | Cl | Cl | H | Ni | 1 | $NH_3$ | 79.5% | yellow-orange |
| 35 | H | H | Cl | H | Cl | Cl | $CH_3O$ | Cl | H | Ni | 1 | $NH_3$ | 93.1% | yellow |
| 36 | H | H | Cl | H | Cl | Cl | Cl | Cl | H | Ni | 1 | $NH_3$ | 97.0% | yellow |
| 37 | H | H | H | H | Cl | Cl | $CH_3O$ | Cl | $CH_3$ | Ni | 1 | $NH_3$ | 83.3% | yellow-brown |
| 38 | H | H | H | H | H | H | H | H | $CH_3$ | Ni | 1 | $NH_3$ | 91.2% | yellow |
| 39 | H | H | H | H | H | $CH_3$ | $CH_3O$ | Cl | H | Cu | 1 | $NH_3$ | 81.5% | greenish-tinged yellow |
| 40 | H | H | H | H | Cl | Cl | $CH_3O$ | Cl | H | Ni | 1 | Hydroxylamine | 94.2% | yellow |
| 41 | H | H | H | H | Cl | Cl | Cl | Cl | H | Ni | 1 | Morpholine | 85.6% | yellow |
| 42 | H | H | H | H | Cl | Cl | $CH_3O$ | Cl | H | Ni | 1 | Benzylamine | 93.6% | yellow |
| 43 | H | H | H | H | Cl | Cl | PhO | Cl | H | Ni | 1 | Benzylamine | 89.6% | yellow |
| 44 | H | H | H | H | Cl | Cl | Cl | Cl | H | Ni | 1 | Benzylamine | 97.5% | yellow |
| 45 | H | H | H | H | H | H | H | H | H | Ni | 1 | Benzylamine | 85.1% | yellow |
| 46 | H | H | $CH_3$ | H | Cl | Cl | Cl | Cl | H | Ni | 1 | Benzylamine | 88.5% | yellow |
| 47 | H | H | Cl | H | Cl | Cl | Cl | Cl | H | Ni | 1 | Benzylamine | 77.2% | yellow |
| 48 | H | H | $CH_3$ | H | Cl | Cl | $CH_3O$ | Cl | H | Ni | 1 | Benzylamine | 87.5% | yellow |
| 49 | H | H | Cl | H | Cl | Cl | $CH_3O$ | Cl | H | Ni | 1 | Benzylamine | 90.9% | yellow |
| 50 | H | H | H | H | Cl | Cl | $CH_3O$ | Cl | $CH_3$ | Ni | 1 | Benzylamine | 90.6% | yellow |
| 51 | H | H | H | H | H | H | H | H | $CH_3$ | Ni | 1 | Benzylamine | 92.0% | yellow |
| 52 | H | H | H | H | $CH_3O$ | Cl | $CH_3O$ | Cl | H | Ni | 1 | $NH_2-CH=NH$ | 89.3% | yellow |
| 53 | H | H | $CH_3$ | H | $CH_3O$ | Cl | $CH_3O$ | Cl | H | Ni | 1 | Aniline | 90.3% | yellow |
| 54 | H | H | $CH_3$ | H | Cl | Cl | Cl | Cl | H | Ni | 1 | Aniline | 92.1% | yellow |
| 55 | H | H | H | H | $CH_3O$ | Cl | $CH_3O$ | Cl | $CH_3$ | Ni | 1 | Aniline | 80.6% | yellow |
| 56 | H | H | H | H | H | H | H | H | $CH_3$ | Ni | 1 | Aniline | 84.6% | yellow |
| 57 | H | H | H | H | Cl | Cl | Cl | Cl | H | Ni | 1 | Pyridine | 96.0% | yellow |
| 58 | H | H | H | H | Cl | Cl | $CH_3O$ | Cl | H | Ni | 1 | Pyridine | 96.0% | yellow |
| 59 | H | H | H | H | $CH_3O$ | Cl | $CH_3O$ | Cl | H | Cu | 1 | Pyridine | 94.4% | greenish-tinged yellow |
| 60 | H | H | Cl | H | Cl | Cl | Cl | Cl | H | Ni | 1 | Pyridine | 91.5% | yellow |
| 61 | H | H | $CH_3$ | H | Cl | Cl | Cl | Cl | H | Ni | 1 | Pyridine | 96.8% | yellow |
| 62 | H | H | H | H | Cl | Cl | $CH_3O$ | Cl | $CH_3$ | Ni | 1 | Pyridine | 90.3% | yellow-brown |
| 63 | H | H | H | H | H | H | H | H | $CH_3$ | Ni | 1 | Pyridine | 83.3% | yellow |
| 64 | H | H | H | H | $CH_3O$ | Cl | $CH_3O$ | Cl | H | Ni | 1 | 2-Quinoline | 87.5% | yellow |
| 65 | H | H | H | H | $CH_3O$ | Cl | $CH_3O$ | Cl | H | Ni | 1 | Phenylhydrazine | 93.0% | yellow |
| 66 | H | H | H | H | $CH_3O$ | Cl | $CH_3O$ | Cl | H | Ni | 1 | Benzhydrazide | 90.0% | yellow |
| 67 | H | H | H | H | $CH_3O$ | Cl | $CH_3O$ | Cl | H | Ni | 1 | Decanethiol | 88.6% | yellow-brown |
| 68 | H | H | H | H | $CH_3O$ | Cl | $CH_3O$ | Cl | H | Ni | 2 | Ethylenediamine | 87.5% | yellow |
| 69 | H | H | $CH_3$ | H | Cl | Cl | $CH_3O$ | Cl | H | Ni | 2 | Ethylenediamine | 85.7% | yellow |
| 70 | H | H | $CH_3$ | H | Cl | Cl | Cl | Cl | H | Ni | 2 | Ethylenediamine | 90.1% | yellow |
| 71 | H | H | Cl | H | Cl | Cl | Cl | Cl | H | Ni | 2 | Ethylenediamine | 82.1% | yellow |
| 72 | H | H | Cl | H | Cl | Cl | $CH_3O$ | Cl | H | Ni | 2 | Ethylenediamine | 89.7% | yellow |
| 73 | H | H | H | H | H | H | H | H | $CH_3$ | Ni | 2 | Ethylenediamine | 86.4% | yellow |
| 74 | H | H | H | H | $CH_3O$ | Cl | $CH_3O$ | Cl | H | Ni | 2 | Propylenediamine | 92.9% | yellow |
| 75 | H | H | H | H | Cl | Cl | Cl | Cl | H | Ni | 2 | Propylenediamine | 86.2% | yellow |
| 76 | H | H | H | H | Cl | Cl | $CH_3O$ | Cl | H | Ni | 2 | Hexamethylenediamine | 93.1% | yellow |
| 77 | H | H | Cl | H | Cl | Cl | Cl | Cl | H | Ni | 2 | Hexamethylenediamine | 93.6% | yellow |
| 78 | H | H | H | H | H | H | H | H | $CH_3$ | Ni | 2 | Hexamethylenediamine | 94.7% | yellow |
| 79 | H | H | H | H | Cl | Cl | $CH_3O$ | Cl | H | Ni | 2 | Piperazine | 82.1% | yellow |
| 80 | H | H | H | H | $CH_3O$ | Cl | $CH_3O$ | Cl | H | Ni | 2 | Piperazine | 71.4% | yellow |
| 81 | H | H | H | H | Cl | Cl | Cl | Cl | H | Ni | 2 | Piperazine | 35.3% | yellow |
| 82 | H | H | $CH_3$ | H | Cl | Cl | Cl | Cl | H | Ni | 2 | Piperazine | 94.3% | yellow |
| 83 | H | H | $CH_3$ | H | Cl | Cl | $CH_3O$ | Cl | H | Ni | 2 | Piperazine | 65.5% | yellow |
| 84 | H | H | Cl | H | Cl | Cl | Cl | Cl | H | Ni | 2 | Piperazine | 78.2% | yellow |
| 85 | H | H | H | H | H | H | H | H | CH | Ni | 2 | Piperazine | 90.9% | yellow |
| 86 | H | H | H | H | $CH_3O$ | Cl | $CH_3O$ | Cl | H | Ni | 2 | p-Phenylenenediamine | 98.3% | yellow |
| 87 | H | H | H | H | Cl | Cl | $CH_3O$ | Cl | H | Ni | 2 | 4,4'-Diamino-diphenylsulphone | | |
| 88 | H | H | H | H | $CH_3O$ | Cl | $CH_3O$ | Cl | H | Ni | 2 | Terephthaldialdehyde bis-hydrazone | 96.7% | yellow |
| 89 | H | H | H | H | $CH_3O$ | Cl | $CH_3O$ | Cl | H | Ni | 2 | Terephthalic acid bis-hydrazide | 100% | yellow-brown |
| 90 | H | H | H | H | $CH_3O$ | Cl | $CH_3O$ | Cl | H | Ni | 2 | 2-Methyl-4,4'-Diaminobenzene | 94.7% | yellow |

TABLE 2-continued

| Example | $Y_1$ | $Y_2$ | $Y_3$ | $Y_4$ | $X_3$ | $X_4$ | $X_5$ | $X_6$ | R | M | n | L | Yield | Shade in PVC |
|---|---|---|---|---|---|---|---|---|---|---|---|---|---|---|
| 91 | H | H | H | H | $CH_3O$ | Cl | $CH_3O$ | Cl | H | Ni | 3 | 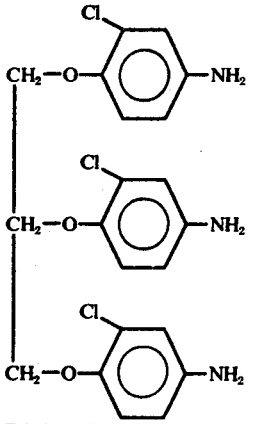 | 87.5% | yellow |
| 92 | H | H | H | H | Cl | Cl | Cl | Cl | $C_6H_5$ | Ni | | Ethylenediamine | | reddish-tinged yellow |

The metal complexes of the formula (B) wherein the symbols have the meaning indicated in Table 3, are obtained in accordance with the instructions of Example 2.

The metal complexes of the formula (C) wherein the symbols have the meaning indicated in Table 4, are obtained in accordance with the instructions of Example 2 if 4-hydroxycoumarin3-aldhyde is used instead of 2,4-dihydroxyquinolinealdehyde.

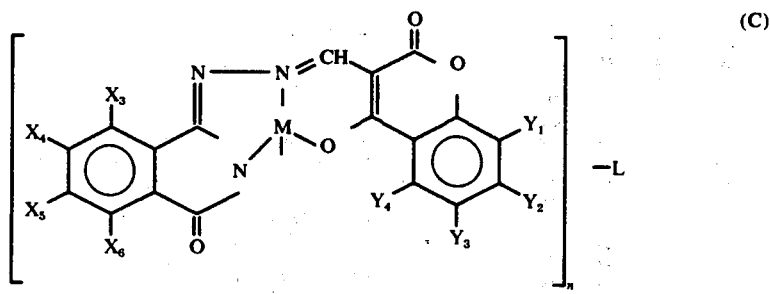
(C)

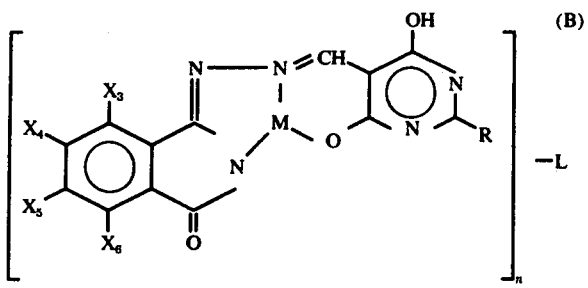
(B)

TABLE 3

| Example | $X_3$ | $X_4$ | $X_5$ | $X_6$ | R | M | n | L | Yield | Shade |
|---|---|---|---|---|---|---|---|---|---|---|
| 93 | Cl | Cl | Cl | Cl | Phenyl | Ni | 1 | Aniline | 89% | yellow |
| 94 | Cl | Cl | $OCH_3$ | Cl | Phenyl | Ni | 1 | Aniline | 89% | yellow |
| 95 | $OCH_3$ | Cl | $OCH_3$ | Cl | Phenyl | Ni | 1 | Aniline | 84% | yellow |
| 96 | $OCH_3$ | Cl | $OCH_3$ | Cl | Phenyl | Ni | 1 | n-Octylamine | 81% | yellow |
| 97 | Cl | Cl | Cl | Cl | p-Tolyl | Ni | 1 | Aniline | 85% | yellow |
| 98 | Cl | Cl | $OCH_3$ | Cl | p-Tolyl | Ni | 1 | Aniline | 85% | yellow |
| 99 | $OCH_3$ | Cl | $OCH_3$ | Cl | p-Tolyl | Ni | 1 | n-Octylamine | 87% | yellow |
| 100 | Cl | Cl | Cl | Cl | H | Ni | 1 | $NH_3$ | 98.1% | yellow |
| 101 | Cl | Cl | Cl | Cl | OH | Ni | 1 | $NH_3$ | 71.0% | yellow |
| 102 | Cl | Cl | Cl | Cl | OH | Cu | 1 | $NH_3$ | 92.3% | yellow |
| 103 | $CH_3O$ | Cl | $CH_3O$ | Cl | OH | Ni | 1 | $NH_3$ | 92.0% | yellow |
| 104 | $CH_3O$ | Cl | $CH_3O$ | Cl | OH | Cu | 1 | $NH_3$ | 96.0% | greenish-tinged yellow |
| 105 | Cl | Cl | PhO | Cl | OH | Ni | 1 | $NH_3$ | 89.3% | yellow |
| 106 | Cl | Cl | Cl | Cl | Ph | Ni | 1 | $NH_3$ | 95.2% | yellow |

TABLE 3-continued

| Example | X₃ | X₄ | X₅ | X₆ | R | M | n | L | Yield | Shade |
|---|---|---|---|---|---|---|---|---|---|---|
| 107 | Cl | Cl | CH₃O | Cl | Ph | Ni | 1 | NH₃ | 92.4% | yellow |
| 108 | Cl | Cl | CH₃O | Cl | p-Tolyl | Ni | 1 | NH₃ | 96.6% | yellow |
| 109 | Cl | Cl | CH₃O | Cl | Ph | Ni | 1 | Benzylamine | 93.9% | yellow |
| 110 | Cl | Cl | CH₃O | Cl | p-Tolyl | Ni | 1 | Benzylamine | 85.3% | yellow |
| 111 | Cl | Cl | CH₃O | Cl | p-Tolyl | Ni | 1 | NH₂—CH=NH | 92.4% | yellow |
| 112 | Cl | Cl | CH₃O | Cl | Phenyl | Ni | 1 | Pyridine | 93.4% | yellow |
| 113 | Cl | Cl | Cl | Cl | Phenyl | Ni | 1 | Pyridine | 98.5% | yellow |
| 114 | Cl | Cl | CH₃O | Cl | Phenyl | Cu | 1 | Aniline | 87.5% | greenish-tinged yellow |
| 115 | Cl | Cl | Cl | Cl | Phenyl | Ni | 1 | Benzylamine | 97.0% | yellow-orange |
| 116 | Cl | Cl | Cl | Cl | Phenyl | Ni | 1 | Morpholine | 98.1% | yellow |
| 117 | Cl | Cl | Cl | Cl | OH | Ni | 1 | Benzylamine | 85.4% | yellow |
| 118 | Cl | Cl | Cl | Cl | OH | Ni | 1 | Aniline | 78.4% | yellow |
| 119 | Cl | Cl | Cl | Cl | Phenyl | Ni | 1 | N-Methylpiperazine | 91.7% | yellow |
| 120 | Cl | Cl | Cl | Cl | Phenyl | Ni | 1 | N-Phenylpiperazine | 97.8% | yellow |
| 121 | Cl | Cl | Cl | Cl | Phenyl | Ni | 1 | 2-Aminobenzimidazole | 94.6% | brown |
| 122 | Cl | Cl | Cl | Cl | Phenyl | Ni | 1 | Hydrazine hydrate | 99.5% | yellow |
| 123 | Cl | Cl | Cl | Cl | Phenyl | Ni | 1 | 2-Aminobenzthiazole | 87.6% | yellow-brown |
| 124 | CH₃O | Cl | CH₃O | Cl | Phenyl | Ni | 1 | Benzylamine | 83.3% | yellow |
| 125 | Cl | Cl | Cl | Cl | OH | Ni | 2 | Ethylenediamine | 70.9% | yellow |
| 126 | Cl | Cl | CH₃O | Cl | OH | Ni | 2 | Ethylenediamine | 92.3% | yellow |
| 127 | CH₃O | Cl | CH₃O | Cl | OH | Ni | 2 | Ethylenediamine | 84.6% | yellow |
| 128 | Cl | Cl | Cl | Cl | H | Ni | 2 | Ethylenediamine | 87.9% | yellow |
| 129 | Cl | Cl | CH₃O | Cl | Phenyl | Ni | 2 | Ethylenediamine | 93.1% | yellow |
| 130 | Cl | Cl | CH₃O | Cl | p-Tolyl | Ni | 2 | Ethylenediamine | 90.1% | yellow |
| 131 | Cl | Cl | Cl | Cl | OH | Ni | 2 | Propylenediamine | 82.5% | yellow |
| 132 | Cl | Cl | Cl | Cl | OH | Ni | 2 | Piperazine | 93.5% | yellow |
| 133 | Cl | Cl | Cl | Cl | H | Ni | 2 | Piperazine | 96.0% | yellow |
| 134 | Cl | Cl | Cl | Cl | Phenyl | Ni | 2 | Piperazine | 100% | yellow |
| 135 | Cl | Cl | CH₃O | Cl | Phenyl | Ni | 2 | Piperazine | 86.6% | yellow |
| 136 | Cl | Cl | CH₃O | Cl | p-Tolyl | Ni | 2 | Piperazine | 93.3% | yellow |
| 137 | Cl | Cl | Cl | Cl | Phenyl | Ni | 2 | 4,4'-Diaminodiphenylsulphone | 88.2% | yellow |
| 138 | Cl | Cl | Cl | Cl | Phenyl | Ni | 2 | 4,4'-Diaminocyclohexane | 95.8% | yellow |
| 139 | Cl | Cl | Cl | Cl | Phenyl | Ni | 2 | 2-Methyl-4,4'-diaminoazobenzene | 89.9% | yellow |
| 140 | Cl | Cl | Cl | Cl | Phenyl | Ni | 2 | 1,3-Diphenyldiaminopropane | 90.1% | yellow |
| 141 | CH₃O | Cl | CH₃O | Cl | Phenyl | Ni | 2 | Piperazine | | yellow |
| 142 | CH₃O | Cl | CH₃O | Cl | p-Tolyl | Ni | 2 | Piperazine | | yellow |
| 143 | CH₃O | Cl | CH₃O | Cl | Phenyl | Ni | 2 | Ethylenediamine | | yellow |
| 144 | CH₃O | Cl | CH₃O | Cl | Phenyl | Ni | 2 | Ethylenediamine | | yellow |

TABLE 4

| Example | Y₁ | Y₂ | Y₃ | Y₄ | X₃ | X₄ | X₅ | X₆ | M | n | L | Yield | Shade in PVC |
|---|---|---|---|---|---|---|---|---|---|---|---|---|---|
| 145 | H | H | H | H | Cl | Cl | Cl | Cl | Ni | 1 | NH₃ | 98.2% | yellow |
| 146 | H | H | H | H | Cl | Cl | CH₃O | Cl | Ni | 1 | NH₃ | 100% | yellow |
| 147 | H | H | CH₃ | H | Cl | Cl | Cl | Cl | Ni | 1 | NH₃ | 94.4% | yellow |
| 148 | H | H | CH₃ | H | Cl | Cl | CH₃O | Cl | Ni | 1 | NH₃ | 85.7% | yellow |
| 149 | H | H | Cl | H | Cl | Cl | Cl | Cl | Ni | 1 | NH₃ | 98.5% | yellow |
| 150 | H | H | Cl | H | Cl | Cl | CH₃O | Cl | Ni | 1 | NH₃ | 82.4% | yellow |
| 151 | H | CH₃ | Cl | CH₃ | Cl | Cl | Cl | Cl | Ni | 1 | NH₃ | 85.0% | yellow |
| 152 | H | H | H | H | Cl | Cl | Cl | Cl | Ni | 1 | NH₃ | 97.6% | yellow |
| 153 | H | H | H | H | Cl | Cl | CH₃O | Cl | Ni | 1 | NH₃ | 87.5% | yellow |
| 154 | H | H | CH₃ | H | Cl | Cl | Cl | Cl | Ni | 1 | NH₃ | 97.1% | yellow |
| 155 | H | H | CH₃ | H | Cl | Cl | CH₃O | Cl | Ni | 1 | NH₃ | 90.6% | yellow |
| 156 | H | H | Cl | H | Cl | Cl | Cl | Cl | Ni | 1 | Benzylamine | 94.1% | yellow |
| 157 | H | H | Cl | H | Cl | Cl | CH₃O | Cl | Ni | 1 | Benzylamine | 90.0% | yellow |
| 158 | H | CH₃ | Cl | CH₃ | Cl | Cl | Cl | Cl | Ni | 1 | Benzylamine | 87.5% | yellow |
| 159 | H | H | CH₃ | H | Cl | Cl | Cl | Cl | Ni | 1 | Benzylamine | 89.7% | yellow |
| 160 | H | H | Cl | H | Cl | Cl | Cl | Cl | Ni | 1 | Benzylamine | 98.3% | yellow |
| 161 | H | H | H | H | Cl | Cl | Cl | Cl | Ni | 1 | Pyridine | 99.2% | yellow |
| 162 | H | H | CH₃ | H | Cl | Cl | Cl | Cl | Ni | 1 | Pyridine | 94.5% | yellow |
| 163 | H | H | Cl | H | Cl | Cl | Cl | Cl | Ni | 1 | Pyridine | 93.6% | yellow |
| 164 | H | H | H | H | Cl | Cl | Cl | Cl | Ni | 1 | Morpholine | 92.9% | yellow |
| 165 | H | H | H | H | Cl | Cl | Cl | Cl | Ni | 2 | Ethylenediamine | 94.0% | yellow |
| 166 | H | H | H | H | Cl | Cl | CH₃O | Cl | Ni | 2 | Ethylenediamine | 85.7% | yellow |
| 167 | H | H | CH₃ | H | Cl | Cl | Cl | Cl | Ni | 2 | Ethylenediamine | 96.5% | yellow |
| 168 | H | H | CH₃ | H | Cl | Cl | CH₃O | Cl | Ni | 2 | Ethylenediamine | 92.9% | yellow |
| 169 | H | H | Cl | H | Cl | Cl | Cl | Cl | Ni | 2 | Ethylenediamine | 89.2% | yellow |
| 170 | H | CH₃ | Cl | CH₃ | Cl | Cl | Cl | Cl | Ni | 2 | Ethylenediamine | 78.4% | yellow |
| 171 | H | H | H | H | Cl | Cl | Cl | Cl | Ni | 2 | Ethylenediamine | 91.0% | yellow |
| 172 | H | H | H | H | Cl | Cl | Cl | Cl | Ni | 2 | Hexamethylenediamine | 86.3% | yellow |
| 173 | H | H | H | H | Cl | Cl | Cl | Cl | Ni | 2 | Triethylenediamine | 93.0% | yellow |
| 174 | H | H | H | H | Cl | Cl | Cl | Cl | Ni | 2 | Piperazine | 94.7% | yellow |
| 175 | H | H | H | H | Cl | Cl | CH₃O | Cl | Ni | 2 | Piperazine | 82.1% | yellow |
| 176 | H | H | CH₃ | H | Cl | Cl | CH₃O | Cl | Ni | 2 | Piperazine | 89.7% | yellow |
| 177 | H | H | Cl | H | Cl | Cl | Cl | Cl | Ni | 2 | Piperazine | 89.6% | yellow |
| 178 | H | H | H | H | Cl | Cl | Cl | Cl | Ni | 2 | 4,4'-Diaminodiphenylsulphone | 71.5% | yellow |

The metal complexes of the formula (D) in Table 5 were synthesised as described in Example 2.

(D)

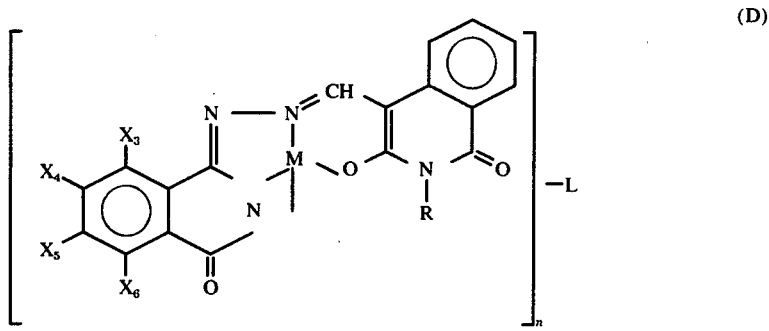

TABLE 5

| Example | $X_3$ | $X_4$ | $X_5$ | $X_6$ | R | M | n | L | Yield | Shade in PVC |
|---|---|---|---|---|---|---|---|---|---|---|
| 179 | Cl | Cl | Cl | Cl | H | Ni | 1 | $NH_3$ | 91.6% | orange |
| 180 | Cl | Cl | $CH_3O$ | Cl | H | Ni | 1 | $NH_3$ | 100% | yellow-orange |
| 181 | Cl | Cl | Cl | Cl | H | Ni | 1 | Benzylamine | 94.5% | orange |
| 182 | Cl | Cl | $CH_3O$ | Cl | H | Ni | 1 | Benzylamine | 100% | orange |
| 183 | Cl | Cl | Cl | Cl | H | Ni | 1 | Aniline | 92.0% | brown |
| 184 | Cl | Cl | Cl | Cl | H | Ni | 1 | Pyridine | 97.4% | brown |
| 185 | Cl | Cl | $CH_3O$ | Cl | H | Ni | 2 | Ethylenediamine | 96.4% | orange |

The metal complexes of the formula (E) wherein the symbols have the meaning indicated in Table 6, are obtained in accordance with the instructions of Example 2.

Metal complexes of the formula (F) wherein the symbols have the meaning indicated in Table 7, are obtained in accordance with instructions of Example 2.

(E)

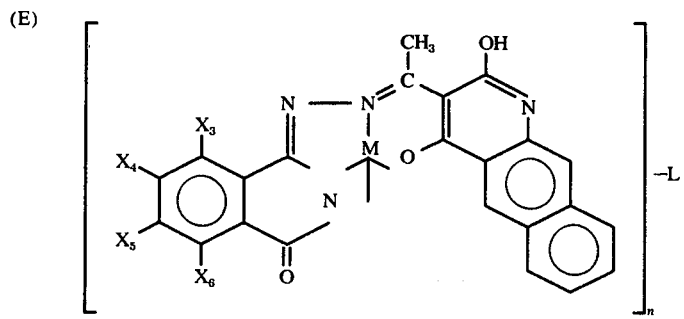

TABLE 6

| Example | $X_3$ | $X_4$ | $X_5$ | $X_6$ | M | n | L | Yield | Shade in PVC |
|---|---|---|---|---|---|---|---|---|---|
| 186 | H | H | H | H | Ni | 1 | $NH_3$ | 78.6% | yellow |
| 187 | $CH_3O$ | Cl | $CH_3O$ | Cl | Ni | 1 | $NH_3$ | 90.0% | yellow |
| 188 | Cl | Cl | Cl | Cl | Ni | 2 | Ethylenediamine | 88.0% | yellow |
| 189 | H | H | H | H | Ni | 2 | Ethylenediamine | 85.7% | yellow |
| 190 | Cl | Cl | $CH_3O$ | Cl | Ni | 2 | Ethylenediamine | 87.1% | yellow |
| 191 | $CH_3O$ | H | $CH_3O$ | Cl | Ni | 2 | Ethylenediamine | 87.1% | yellow |
| 192 | H | H | H | H | Ni | 2 | Piperazine | 66.7% | yellow |
| 193 | Cl | Cl | $CH_3O$ | Cl | Ni | 2 | Piperazine | 54.8% | yellow |
| 194 | $CH_3O$ | Cl | $CH_3O$ | Cl | Ni | 2 | Piperazine | 83.9% | yellow |

(F)

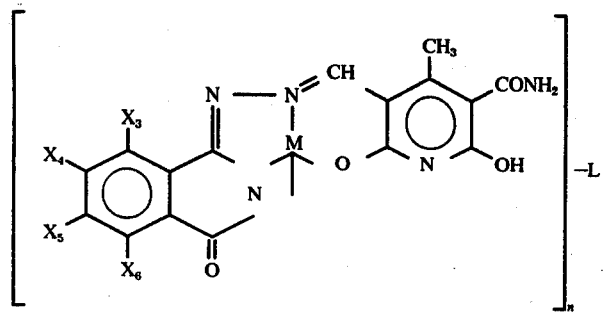

TABLE 7

| Example | $X_3$ | $X_4$ | $X_5$ | $X_6$ | M | n | L | Yield | Shade in PVC |
|---|---|---|---|---|---|---|---|---|---|
| 195 | Cl | Cl | Cl | Cl | Ni | 1 | $NH_3$ | 88.5% | yellow |
| 196 | Cl | Cl | $CH_3$ | Cl | Ni | 1 | $NH_3$ | 92.6% | yellow |
| 197 | Cl | Cl | $CH_3O$ | Cl | Ni | 1 | Benzylamine | 84.4% | yellow |
| 198 | Cl | Cl | Cl | Cl | Ni | 1 | Benzylamine | 71.9% | yellow |
| 199 | $CH_3O$ | Cl | Cl | Cl | Ni | 1 | Aniline | 90.0% | yellow |
| 200 | $CH_3O$ | Cl | $CH_3O$ | Cl | Ni | 1 | Aniline | 86.5% | yellow |
| 201 | Cl | Cl | Cl | Cl | Ni | 1 | Pyridine | 93.5% | yellow |
| 202 | Cl | Cl | Cl | Cl | Ni | 2 | Ethylenediamine | 80.1% | yellow |
| 203 | Cl | Cl | $CH_3O$ | Cl | Ni | 2 | Ethylenediamine | 85.7% | yellow |
| 204 | Cl | Cl | Cl | Cl | Ni | 2 | 4,4'-diamino-diphenylsulphone | 74.0% | yellow |

The metal complexes of the formula (G) wherein the symbols have the meaning indicated in Table 8, are obtained in accordance with the instructions of Example 2.

(G)

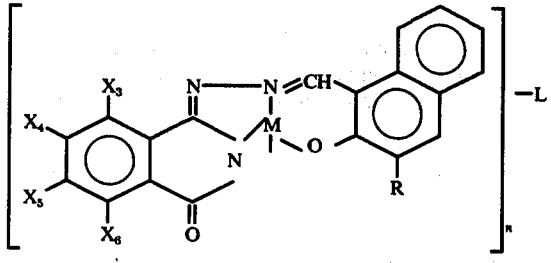

TABLE 8

| Example | $X_3$ | $X_4$ | $X_5$ | $X_6$ | R | M | n | L | Yield | Shade in PVC |
|---|---|---|---|---|---|---|---|---|---|---|
| 205 | Cl | Cl | Cl | Cl | H | Ni | 1 | $NH_3$ | 92.0% | red |
| 206 | Cl | Cl | Cl | Cl | COOH | Ni | 1 | $NH_3$ | 97.5% | orange |
| 207 | Cl | Cl | Cl | Cl | CONH—⌬—Cl | Ni | 1 | $NH_3$ | 100% | orange |
| 208 | Cl | Cl | Cl | Cl | H | Ni | 1 | Benzylamine | 88.1% | orange |
| 209 | Cl | Cl | Cl | Cl | CONH—⌬—Cl | Ni | | Benzylamine | 68.9% | orange |
| 210 | Cl | Cl | Cl | Cl | H | Ni | 1 | Aniline | 95.3% | brown |
| 211 | $CH_3O$ | Cl | $CH_3O$ | Cl | CONH—⌬—Cl | Ni | 1 | Aniline | 78.4% | brown |
| 212 | Cl | Cl | Cl | Cl | H | Ni | 1 | Pyridine | 94.6% | red |
| 213 | Cl | Cl | Cl | Cl | CONH—⌬—Cl | Ni | 1 | Pyridine | 94.7% | brown |
| 214 | Cl | Cl | Cl | Cl | H | Ni | 1 | Morpholine | 86.0% | red |

TABLE 8-continued

| Example | $X_3$ | $X_4$ | $X_5$ | $X_6$ | R | M | n | L | Yield | Shade in PVC |
|---|---|---|---|---|---|---|---|---|---|---|
| 215 | Cl | Cl | Cl | Cl | CONH—C$_6$H$_4$—Cl | Ni | 1 | Morpholine | 93.1% | red |
| 216 | Cl | Cl | Cl | Cl | H | Ni | 1 | N-methylpiperazine | 79.4% | orange |
| 217 | Cl | Cl | Cl | Cl | H | Ni | 1 | N-phenylpiperazine | 93.6% | red |
| 218 | Cl | Cl | Cl | Cl | H | Ni | 2 | Ethylenediamine | 95.2% | red |
| 219 | Cl | Cl | CH$_3$O | Cl | H | Ni | 2 | Ethylenediamine | 85.2% | orange |
| 220 | Cl | Cl | Cl | Cl | CONH—C$_6$H$_4$—Cl | Ni | 2 | Ethylenediamine | 91.0% | red |
| 221 | Cl | Cl | Cl | Cl | CONH—C$_6$H$_4$—Cl | Ni | 2 | Piperazine | 99.0% | orange |
| 222 | Cl | Cl | Cl | Cl | H | Ni | 2 | Piperazine | 95.3% | red |
| 223 | Cl | Cl | Cl | Cl | COOH | Ni | 2 | Piperazine | 91.4% | red-brown |
| 224 | Cl | Cl | Cl | Cl | H | Ni | 2 | 4,4'-diaminodiphenylsulphone | 88.8% | orange |
| 225 | Cl | Cl | Cl | Cl | COOH | Ni | 2 | 1,4-diaminocyclohexane | 70.5% | red-brown |

Metal complexes of the formula (H) wherein the symbols have the meaning indicated in Table 9, are obtained in accordance with the instructions of Example 2.

The metal complexes of the formula (I) wherein the symbols have the meaning indicated in Table 10, are obtained in accordance with the instructions of Example 2.

(H) 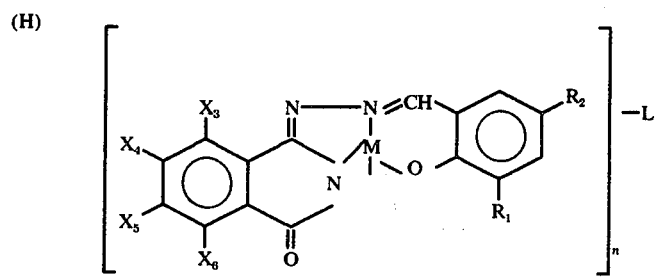

TABLE 9

| Example | $X_3$ | $X_4$ | $X_5$ | $X_6$ | $R_1$ | $R_2$ | M | n | L | Yield | Shade in PVC |
|---|---|---|---|---|---|---|---|---|---|---|---|
| 226 | Cl | Cl | Cl | Cl | H | H | Ni | 1 | NH$_3$ | 98.7% | organge |
| 227 | Cl | Cl | CH$_3$O | Cl | Cl | Cl | Ni | 1 | NH$_3$ | 96.3% | red-brown |
| 228 | Cl | Cl | Cl | Cl | Cl | Cl | Ni | 1 | Benzylamine | 92.0% | orange |
| 229 | Cl | Cl | Cl | Cl | Cl | Cl | Ni | 1 | Aniline | 91.7% | yellow-orange |
| 230 | Cl | Cl | Cl | Cl | Cl | Cl | Ni | 1 | Pyridine | 100% | yellow-orange |
| 231 | Cl | Cl | Cl | Cl | Cl | Cl | Ni | 1 | Morpholine | 95.4% | orange |
| 232 | Cl | Cl | Cl | Cl | H | H | Ni | 1 | Morpholine | 91.3% | yellow-orange |
| 233 | Cl | Cl | Cl | Cl | Cl | Cl | Ni | 2 | Ethylenediamine | 86.7% | red-brown |
| 234 | Cl | Cl | Cl | Cl | Cl | Cl | Ni | 2 | Ethylenediamine | 71.4% | red-brown |
| 235 | Cl | Cl | Cl | Cl | Cl | Cl | Ni | 2 | Piperazine | 99.3% | red-brown |
| 236 | Cl | Cl | Cl | Cl | H | H | Ni | 2 | Piperazine | 94.0% | yellow-orange |
| 237 | Cl | Cl | Cl | Cl | Cl | Cl | Ni | 2 | 4,4'-Diaminodiphenylsulphone | 98.3% | yellow |

(I) 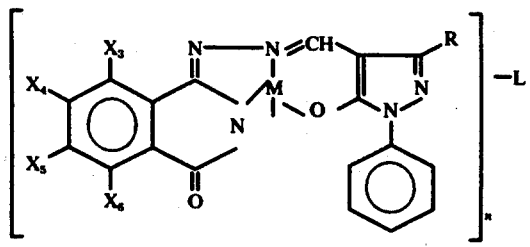

TABLE 10

| Example | $X_3$ | $X_4$ | $X_5$ | $X_6$ | R | M | n | L | Yield | Shade in PVC |
|---|---|---|---|---|---|---|---|---|---|---|
| 238 | Cl | Cl | Cl | Cl | $CH_3$ | Ni | 1 | $NH_3$ | 81.9% | yellow |
| 239 | Cl | Cl | $CH_3O$ | Cl | $CONH_2$ | Ni | 1 | $NH_3$ | 91.3% | yellow |
| 240 | Cl | Cl | $CH_3O$ | Cl | $CONH_2$ | Ni | 1 | Benzylamine | 77.8% | yellow |
| 241 | Cl | Cl | Cl | Cl | $CH_3$ | Ni | 1 | Aniline | 82.8% | yellow |
| 242 | Cl | Cl | Cl | Cl | $CH_3$ | Ni | 2 | Ethylenediamine | 84.1% | yellow |
| 243 | Cl | Cl | $CH_3O$ | Cl | $CONH_2$ | Ni | 2 | Ethylenediamine | 90.0% | yellow |

The metal complexes of the formula (J) wherein the symbols have the meaning indicated in Table 11, are obtained in accordance with the instructions of Example 2.

(J) 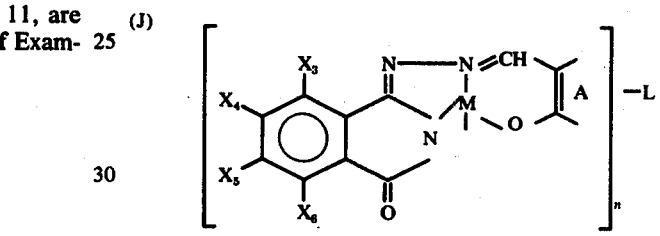

TABLE 11

| Example | $X_3$ | $X_4$ | $X_5$ | $X_6$ | M | ![A structure] | n | L | Yield | Shade in PVC |
|---|---|---|---|---|---|---|---|---|---|---|
| 244 | Cl | Cl | Cl | Cl | Ni | (methyl-CONH₂ pyrido-benzimidazolone) | 1 | $NH_3$ | 91.7% | red |
| 245 | Cl | Cl | Cl | Cl | Ni | " | 1 | Benzylamine | 84.5% | orange |
| 246 | Cl | Cl | Cl | Cl | Ni | " | 1 | Pyridine | 92.0% | orange |
| 247 | Cl | Cl | Cl | Cl | Ni | " | 2 | Ethylenediamine | 90.5% | orange |
| 248 | Cl | Cl | Cl | Cl | Ni | (2,6-dimethyl-4-hydroxypyridine) | 1 | $NH_3$ | 96.9% | yellow |
| 249 | Cl | Cl | Cl | Cl | Ni | " | 2 | Piperazine | 96.0% | orange |
| 250 | Cl | Cl | Cl | Cl | Ni | (dimedone derivative) | 1 | $NH_3$ | 54.6% | yellow |
| 251 | Cl | Cl | Cl | Cl | Ni | " | 1 | Benzylamine | 71.4% | yellow |
| 252 | Cl | Cl | Cl | Cl | Ni | " | 1 | Aniline | 71.8% | yellow |

TABLE 11-continued

| Example | $X_3$ | $X_4$ | $X_5$ | $X_6$ | M | ![A structure] | n | L | Yield | Shade in PVC |
|---|---|---|---|---|---|---|---|---|---|---|
| 253 | Cl | Cl | Cl | Cl | Ni |  | 1 | Pyridine | 88.5% | yellow |
| 254 | Cl | Cl | Cl | Cl | Ni | (dimedone-type structure) | 2 | Ethylenediamine | 94.6% | yellow |
| 255 | Cl | Cl | Cl | Cl | Ni | " | 2 | Piperazine | 96.0% | yellow |
| 256 | Cl | Cl | Cl | Cl | Ni | (chloroquinolinone structure) | 2 | Piperazine | 92.5% | yellow |
| 257 | Cl | Cl | Cl | Cl | Ni | " | 2 | Ethylenediamine | 89.8% | yellow |
| 258 | Cl | Cl | Cl | Cl | Ni | " | 1 | $NH_3$ | 93.8% | yellow |

EXAMPLE 259

189 parts of 2,4-dihydroxyquinoline-3-aldehyde and 2.99 parts of 4,5,6,7-tetrachloroisoindolin-1-onylidenehydrazine are stirred for 15 minutes at 100° C in 150 parts by volume of methylcellosolve. After adding 0.93 part of aniline, followed by 2.50 parts of nickel acetate tetrahydrate, the yellow suspension is stirred for a further 4 hours at 100° C. The reaction product is then filtered off while hot, washed well with methylcellosolve, alcohol and acetone and dried at 80° C in vacuo. This gives 6.0 parts (97% of theory) of an analytically pure, yellow pigment having the formula indicated in Example 1.

For those examples in which L denotes $NH_3$, a gentle stream of ammonia is passed in during the metallisation.

Half a mol of diamine was used for the examples in which n denotes 2, and a third of a mol of triamine was used for Example 91.

EXAMPLE 260

2 g of the pigment prepared in accordance with Example 1 are ground on a triple roll mill together with 36 g of hydrated alumina, 60 g of linseed oil varnish of medium viscosity and 2 g of cobalt linoleate. The yellow prints produced using the resulting colorant paste are deep and outstandingly fast to light.

EXAMPLE 261

0.6 g of the pigment prepared in accordance with Example 1 is mixed with 67 g of polyvinyl chloride, 33 g of dioctyl phthalate, 2 g of dibutyl-tin dilaurate and 2 g of titanium dioxide and the mixture is processed on a roll mill for 15 minutes at 160° C to give a thin sheet. The yellow coloration thus produced is deep and fast to migration, heat and light.

EXAMPLE 262

10 g of titanium dioxide and 2 g of the pigment prepared in accordance with Example 2 are ground for 48 hours in a ball mill together with 88 g of a mixture of 26.4 g of coconut alkyd resin, 24.0 g of melamine-formaldehyde resin (50% solids content), 8.8 g of ethylene glycol monomethyl ether and 28.8 g of xylene.

If this lacquer is sprayed onto an aluminium foil, predried for 30 minutes at room temperature and then stoved for 30 minutes at 120° C, a yellow lacquering is obtained, which is distinguished by good depth of colour and by very good fastness to overlacquering, ligth and weathering.

We claim:

1. A bis-hydrazone metal complex of the formula

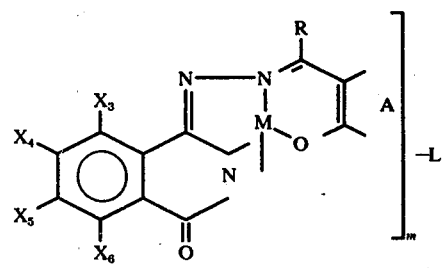

wherein A denotes

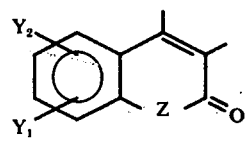

-continued

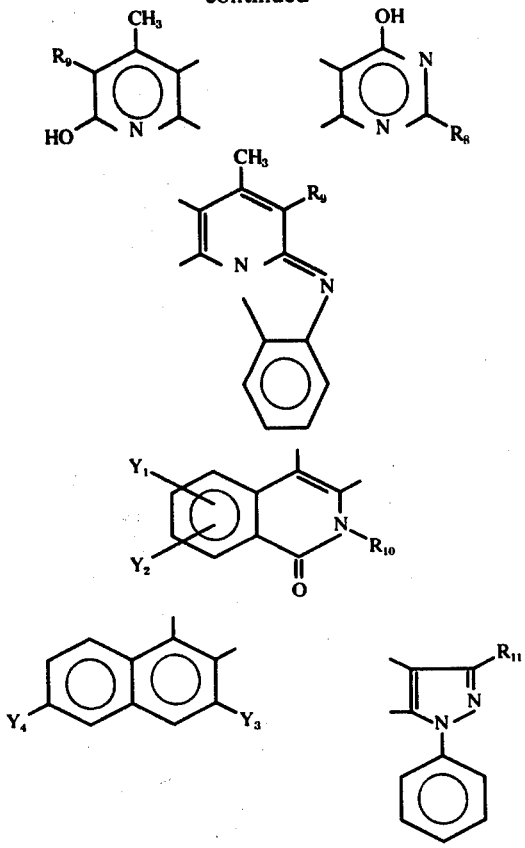

wherein M denotes a divalent transition metal, zinc or cadmium, $Y_1$ and $Y_2$ denote hydrogen, halogen, alkyl of 1-4 carbon atoms, alkoxy of 1-4 carbon atoms, or nitro; Z denotes —NH— or -oxygen-, $R_8$ denotes -OH, alkyl containing 1-4 carbon atoms, phenyl, phenyl substituted with halogen, alkyl of 1-4 carbon atoms, or alkoxy of 1-4 carbon atoms; $R_9$ denotes cyano, carboxyl, or carbamoyl; $R_{10}$ denotes hydrogen, or alkyl; $Y_3$ denotes hydrogen, carboxyl, carbamoyl, phenylcarbamoyl or alkoxycarbonyl containing 2-6 carbon atoms; $Y_4$ denotes hydrogen, halogen, methoxy, nitro or cyano; $R_{11}$ denotes alkyl of 1-4 carbon atoms, alkoxycarbonyl containing 2-5 carbon atoms, carboxyl, carbamoly,

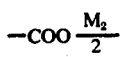

wherein $M_2$ denotes Ca, Sr, Ba or Mn; L denotes

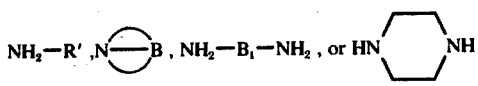

wherein R' denotes hydrogen, hydroxyl, alkyl having 1-10 carbon atoms, phenalkyl containing 1-4 carbon atoms, cycloalkyl containing 5-6 carbon atoms, an aromatic group selected from the group consisting of phenyl, methylphenyl, chlorophenyl, or methoxyphenyl, amino, alkylamino containing 1-6 carbon atoms, or a group of the formulas

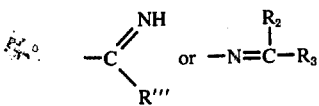

wherein $R_2$ and $R_3$ denote hydrogen, alkyl of 1-6 carbon atoms, or phenyl; R''' denotes hydrogen, amino, alkyl containing 1-6 carbon atoms, phenyl, phenyl substituted by halogen, alkyl containing 1-4 carbon atoms or alkoxy containing 1-4 carbon atoms; R denotes hydrogen, alkyl containing 1-4 carbon atoms or phenyl; B denotes a radical which, conjointly with the N atoms, forms a heterocyclic ring selected from the group consisting of pyridine, quinoline, piperidine, or morpholine; $B_1$ denotes alkylene containing 2-10 carbon atoms, phenylene, a group —Ph—X—Ph— wherein X denotes a direct bond, —O—, —S—, methylene, ethylene, -NH-, —SO_2—, —CO— or —N=N—; $X_3$ denotes hydrogen, halogen, alkoxy containing 1-6 carbon atoms, nitro, carboxyl, carbamoyl, or alkanolyamino containing 2-6 carbon atoms; $X_4$ denotes hydrogen or chloro; $X_5$ denotes hydrogen, chloro, alkoxy, containing 1-6 carbon atoms, alkylmercapto containing 1-6 carbon atoms, phenalkoxy having an alkyl containing 1-4 carbon atoms or phenoxy; $X_6$ denotes hydrogen, chloro, nitro, carboxyl, carbamoyl, alkylcarbamoyl containing 2-6 carbon atoms, alkanoylamino containing 2-6 carbon atoms or phenylcarbamoyl; and m denotes the number 1-2.

2. A bis-hydrazone metal complex according to claim 1 of the formula

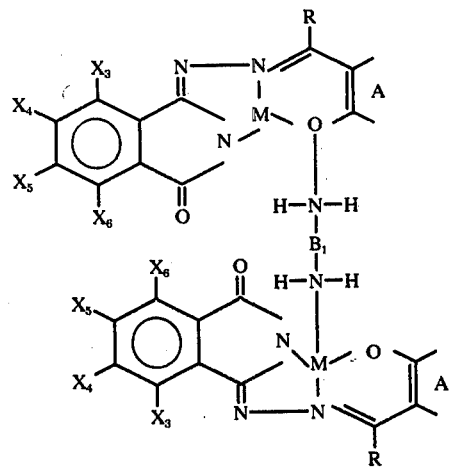

wherein A, R, M and $X_3$ - $X_6$ have the meaning indicated in claim 1, and $B_1$ denotes an alkylene group containing 2 - 10 C atoms, or a phenylene group.

3. A bis-hydrazone metal complex according to claim 1, wherein, in the formulae indicated, R denotes a H atom, an alkyl group containing 1 - 4 C atoms, or a phenyl group.

4. A bis-hydrazone metal complex according to claim 1, wherein M denotes a copper atom or, a Ni atom.

5. A bis-hyrazone metal complex according to claim 1, wherein $X_4$ and $X_6$ denote H or chlorine atoms, and $X_3$ and $X_5$ denote H or chlorine atoms or alkoxy groups containing 1 - 4 C atoms.

6. A bis-hydrazone metal complex according to claim 1, wherein A denotes a radical of the formula

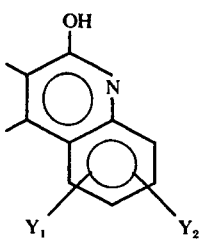

wherein $Y_1$ $Y_2$ denote H or halogen atoms, alkyl or alkoxy groups containing 1 – 4 C atoms, or nitro groups.

7. A bis-hydrazone metal complex according to claim 1, wherein A denotes a radical of the formula

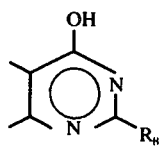

wherein $R_8$ denotes an OH group, an alkyl group containing 1 – 4 C atoms, or a phenyl radical which is optionally substituted by halogen atoms or alkyl or alkoxy groups containing 1 – 4 C atoms.

8. A bis-hydrazone metal complex according to claim 1, wherein A denotes a radical of the formula

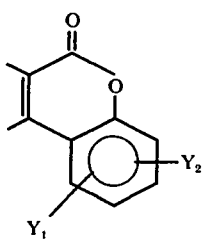

wherein $Y_1$ and $Y_2$ have the meaning indicated in claim 1.

9. A bis-hydrazone metal complex according to claim 1, wherein L denotes ammonia.

10. A bis-hydrazone metal complex according to claim 1, wherein L denotes ethylenediamine.

11. A bis-hydrazone metal complex according to claim 1, wherein L denotes piperazine.

12. The compound as claimed in claim 1 of the formula

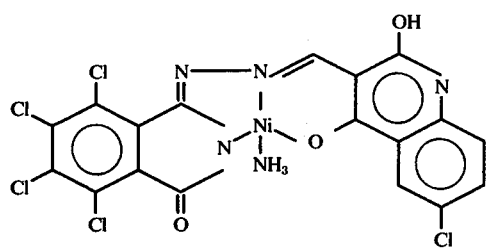

13. The compound as claimed in claim 1 of the formula

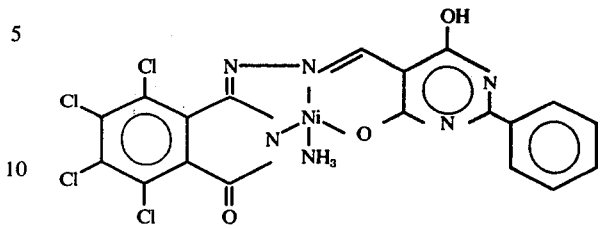

14. The compound as claimed in claim 1 of the formula

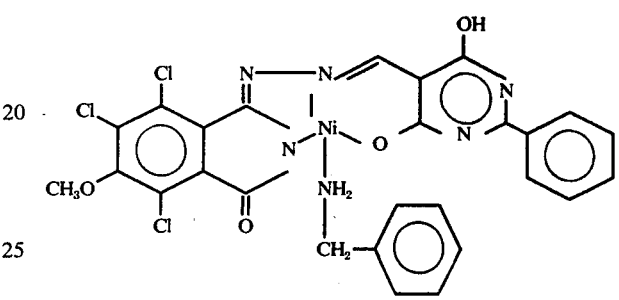

15. The compound as claimed in claim 1 of the formula

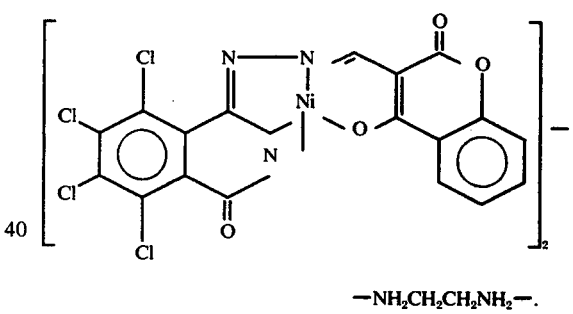

$-NH_2CH_2CH_2NH_2-$.

16. The compound as claimed in claim 1 of the formula

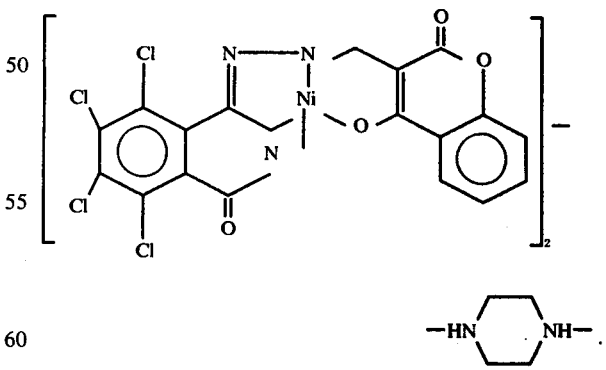

* * * * *

UNITED STATES PATENT AND TRADEMARK OFFICE
CERTIFICATE OF CORRECTION

PATENT NO. : 4,016,157
DATED : April 5, 1977
INVENTOR(S) : Laurent Vuitel, Francois L'Eplattenier and André Pugin It is certified that error appears in the above-identified patent and that said Letters Patent are hereby corrected as shown below:

Column 29, line 48, delete "carbamoly" and insert therefor --- carbamoyl ---.

Column 31, line 12, after $Y_1$ insert --- and ---.

Signed and Sealed this

Fifteenth Day of November 1977

[SEAL]

Attest:

RUTH C. MASON
Attesting Officer

LUTRELLE F. PARKER
Acting Commissioner of Patents and Trademarks